(No Model.) 6 Sheets—Sheet 1.

M. P. SIMPSON & E. P. WILLIAMS.
COMBINED CORN PLANTER, SEED DRILL, AND CULTIVATOR.

No. 529,423. Patented Nov. 20, 1894.

Witnesses:
F. G. Fischer
G. B. Thorpe

Inventors:
M. P. Simpson
and Eli P. Williams,
By Higdon & Higdon
Attys.

(No Model.) 6 Sheets—Sheet 4.

M. P. SIMPSON & E. P. WILLIAMS.
COMBINED CORN PLANTER, SEED DRILL, AND CULTIVATOR.

No. 529,423. Patented Nov. 20, 1894.

Witnesses:
F. G. Fischer
G. W. Thorpe

Inventors:
M. P. Simpson
and Eli P. Williams
By Higdon & Higdon
Attys.

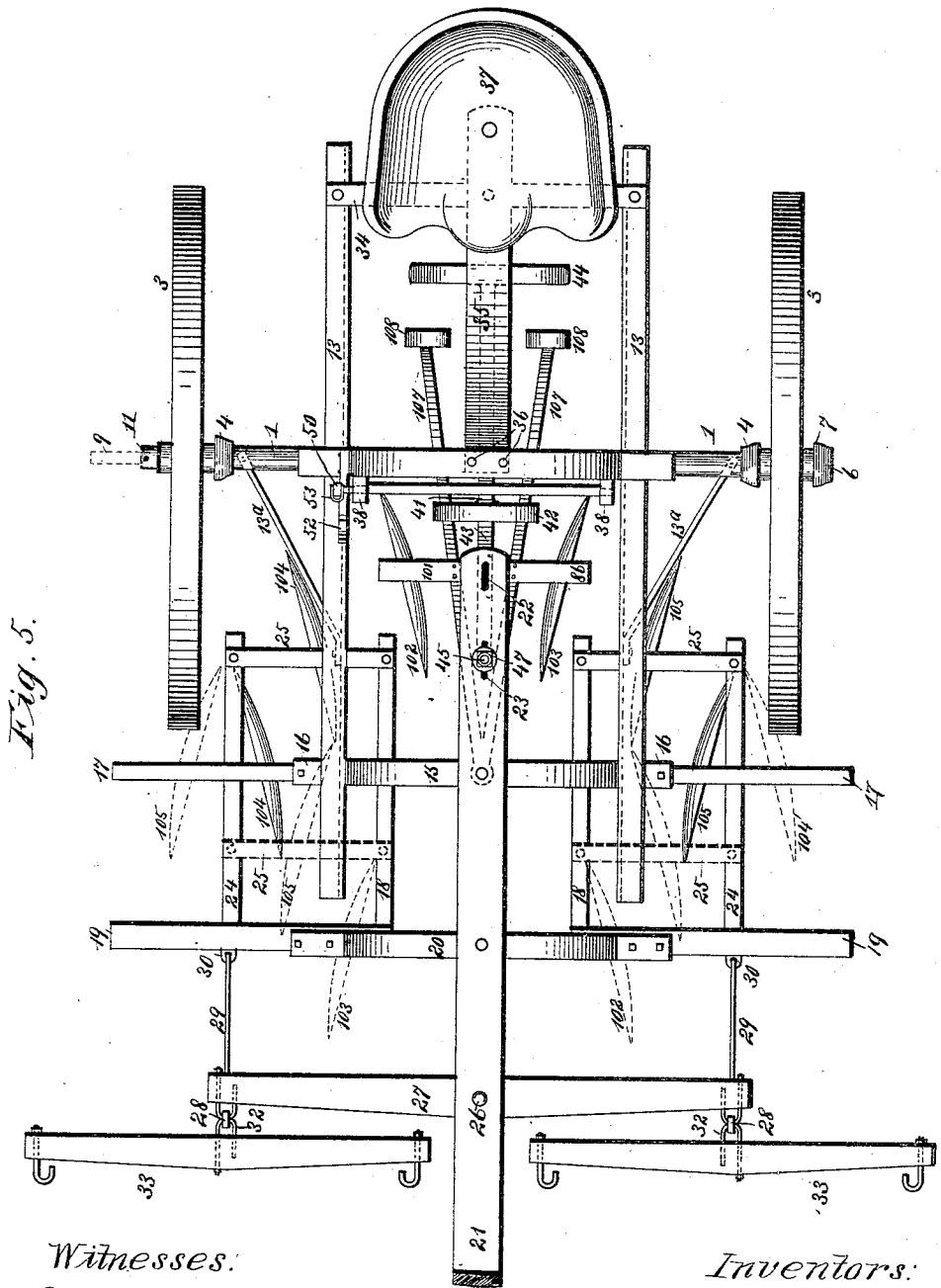

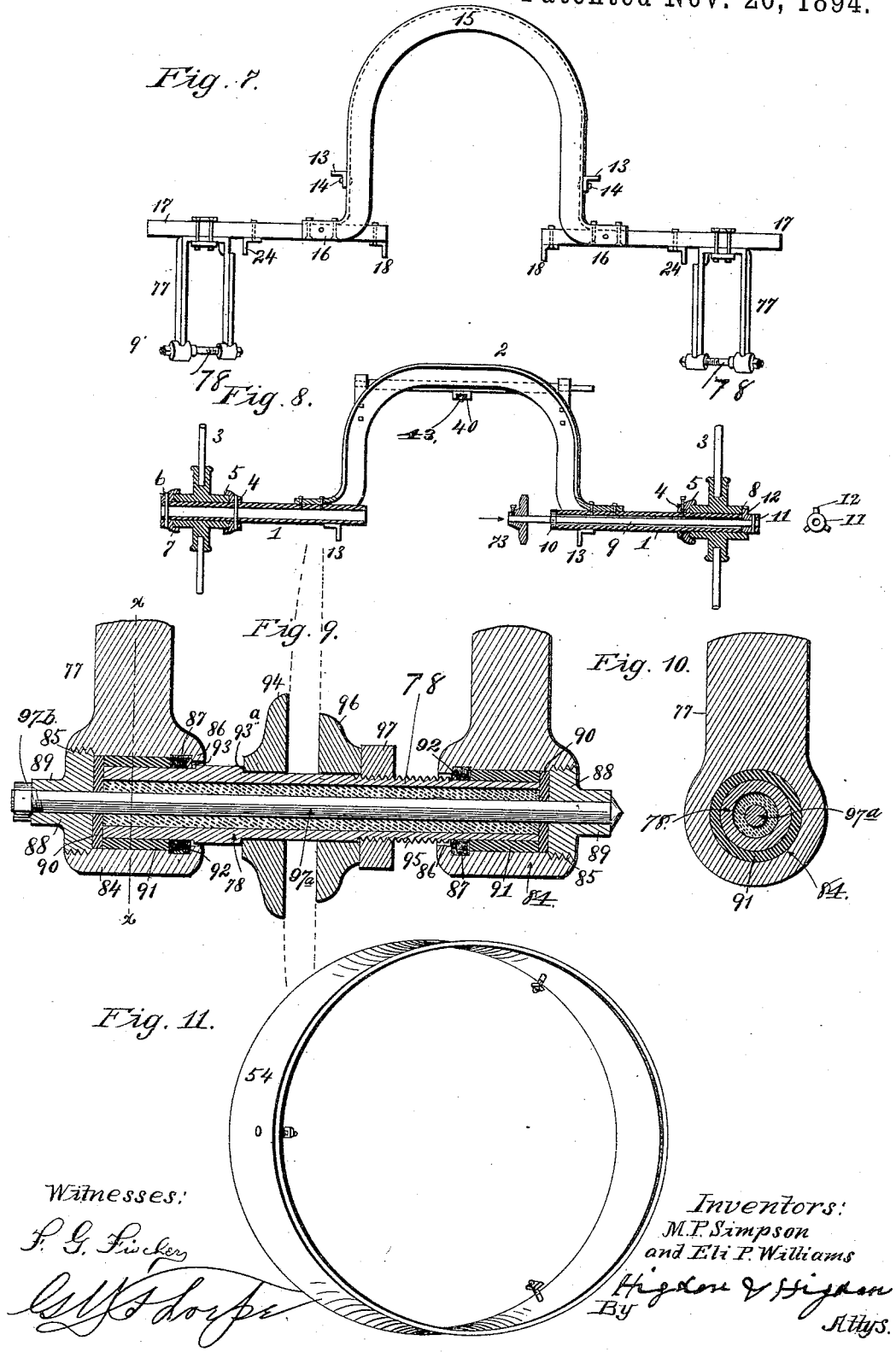

UNITED STATES PATENT OFFICE.

MATTHEW P. SIMPSON AND ELI P. WILLIAMS, OF McPHERSON, KANSAS.

COMBINED CORN-PLANTER, SEED-DRILL, AND CULTIVATOR.

SPECIFICATION forming part of Letters Patent No. 529,423, dated November 20, 1894.

Application filed April 30, 1894. Serial No. 509,452. (No model.)

*To all whom it may concern:*

Be it known that we, MATTHEW P. SIMPSON and ELI P. WILLIAMS, of McPherson, McPherson county, Kansas, have invented certain new and useful Improvements in a Combined Corn-Planter, Seed-Drill, and Cultivator, of which the following is a full, clear, and exact description, reference being had to the accompanying drawings, forming a part hereof.

Our invention relates to combined corn-planters, cultivators and seed-drills, and has for its primary object to produce a construction which can be converted or reconverted from one form of machine into another easily and expeditiously, and which also is simple, durable and inexpensive of construction.

A further object of the invention is to produce means whereby the front end of the machine may be elevated when traveling to or from the field, and at other times when necessary.

A still further object is to produce a construction whereby the cutting or soil-turning disks may be arranged to turn the soil inward or outward, and to change the positions of these disks to produce varying results.

With these objects in view, and others, as will hereinafter appear, the invention consists in certain peculiar and novel features of construction and combinations of parts, as hereinafter described and claimed.

In order that the invention may be fully understood, reference is to be had to the accompanying drawings, in which—

Figure 1:
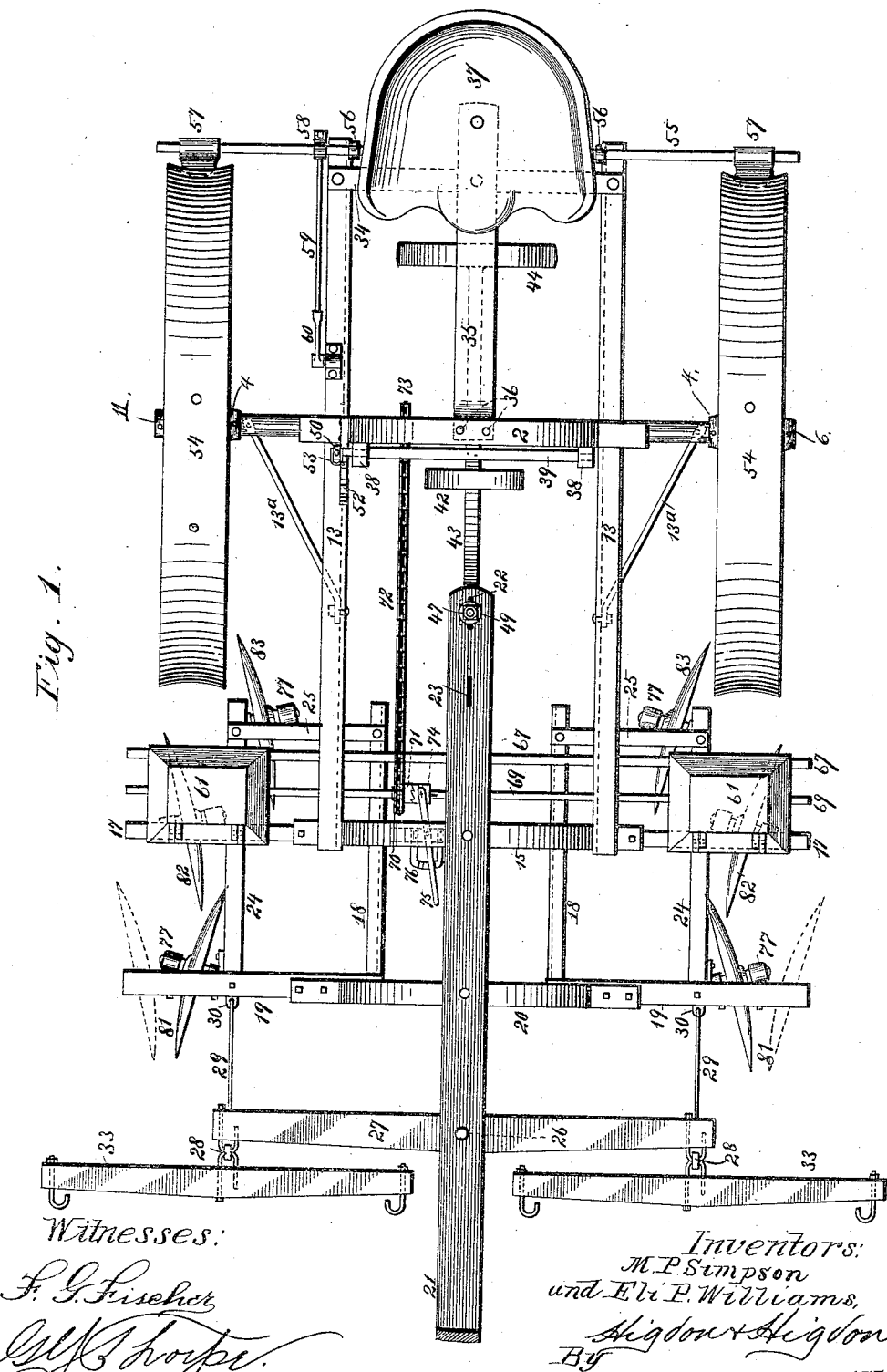
Figure 2:
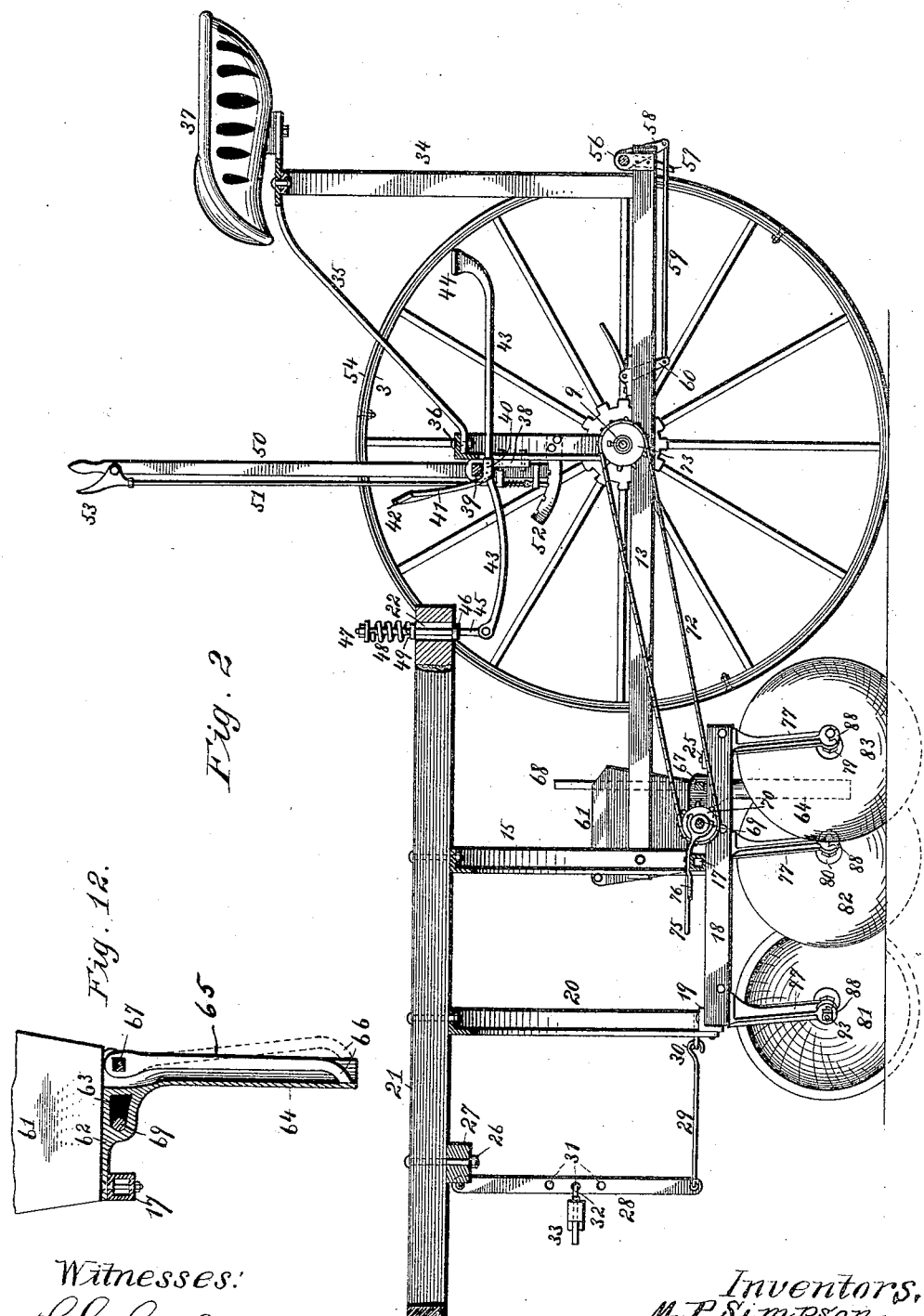
Figure 3:
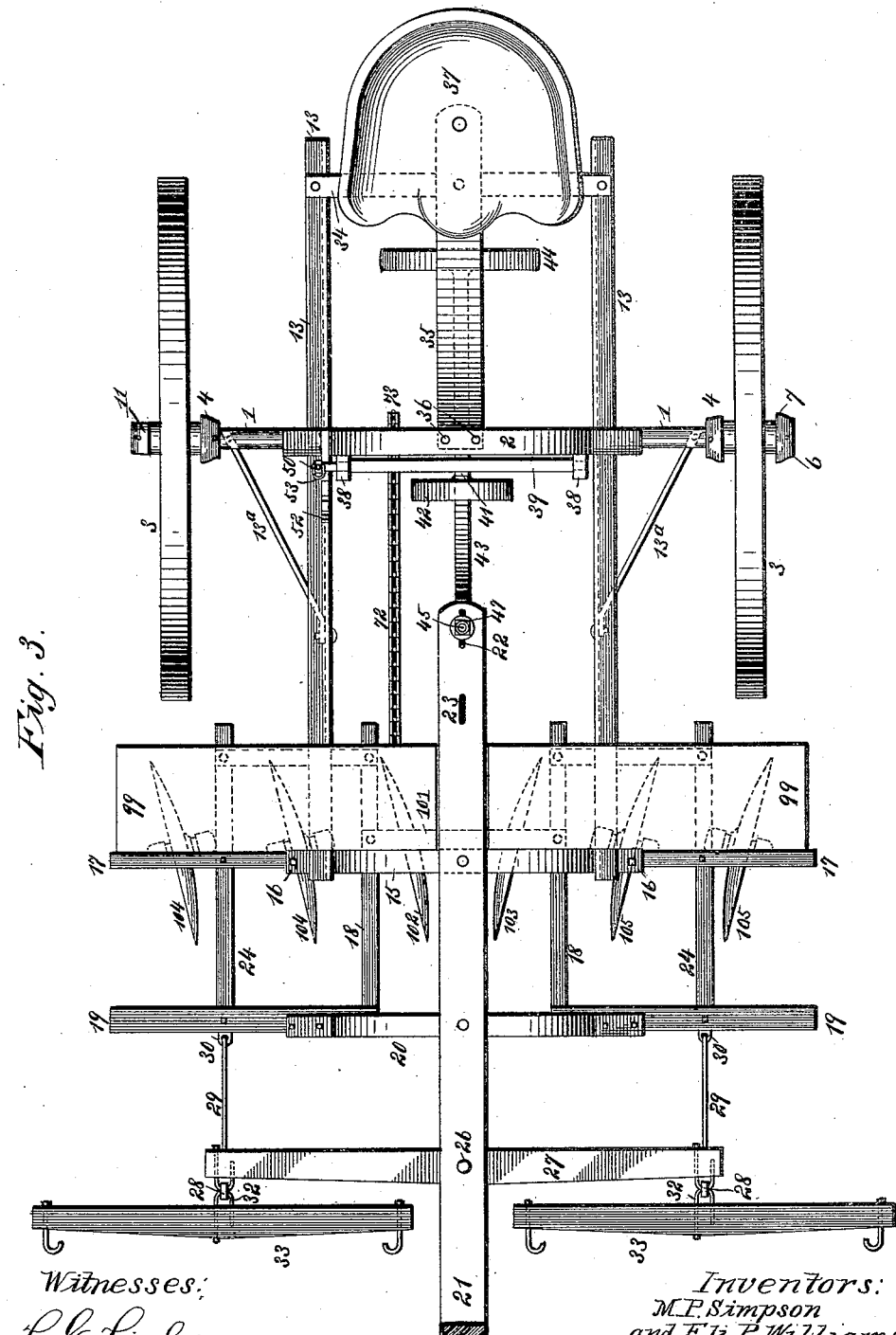
Figure 4:
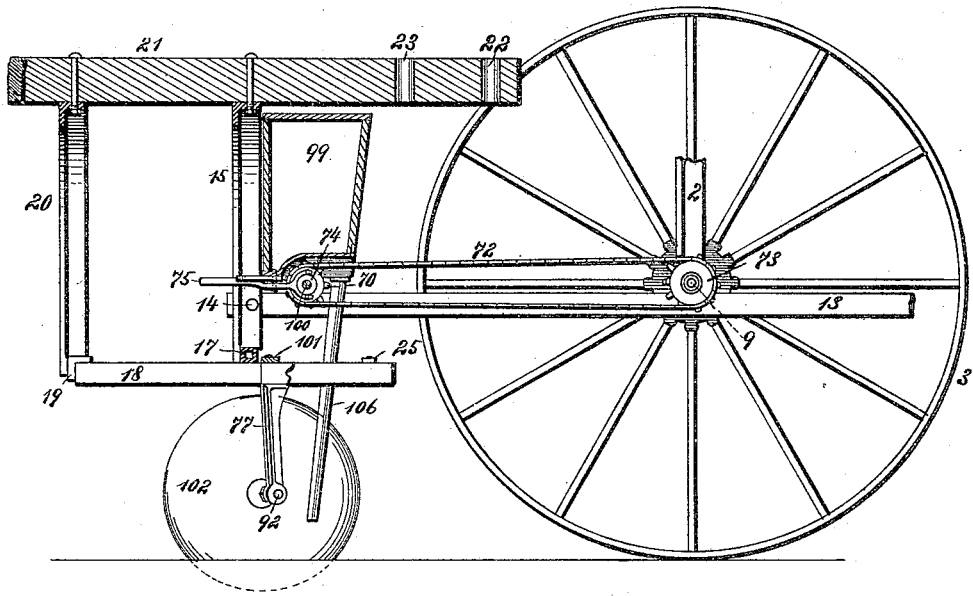
Figure 6:
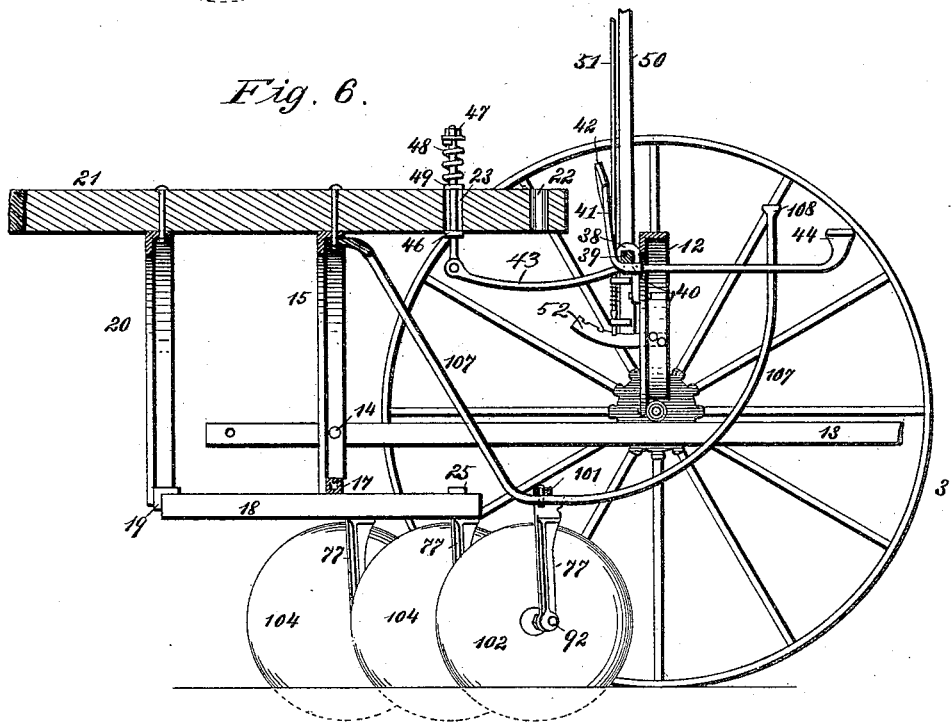

Figure 1. represents a top plan view of a corn-planter constructed in accordance with our invention. Fig. 2. represents a central vertical and longitudinal sectional view of the same. Fig. 3. represents a top plan view of a seed-drill embodying our improvements. Fig. 4. represents a central vertical longitudinal section of the same. Fig. 5. represents a top plan view of a cultivator embodying our improvements, and Fig. 6. represents a central vertical longitudinal sectional view of the same. Fig. 7. represents in detail a front view of one of the arches comprising a portion of the framework of the machine, and showing pendent therefrom the disk supporting yoke-castings. Fig. 8. is a transverse sectional view in detail of the axle of the machine. Fig. 9. is a vertical sectional view on an enlarged scale of the lower end of one of the disk-supporting yoke castings, and the shaft carried thereby. Fig. 10. is a vertical sectional view taken on the line $x-x$ of Fig. 9. Fig. 11. is a perspective view in detail of the detachable rim of one of the drive-wheels of the machine. Fig. 12. is a vertical sectional view of one of the corn hoppers or receptacles and its component parts.

In the following description, it will be observed that we have first referred to the parts common to all of the machines, and then successively to the additional construction necessary to complete the corn planter, the seed-drill and the cultivator.

In the said drawings, the axle comprises the longitudinally aligned tubular and cylindrical portions 1, 1, and the arch 2, connecting the inner ends of the same, and mounted loosely upon and near the outer ends of the said tubular portions are wheels 3, 3, and to prevent the inward movement of the wheels upon the axle, the annular collars 4 are provided; these collars being bolted or otherwise rigidly secured upon the axle, and having annular flanges 5, which overlap the inner margins of the hubs of said wheels. A similar collar 6 is bolted or otherwise rigidly secured upon one end of the axle, and this collar is provided with an inwardly projecting annular flange 7, which overlaps the outer margin of the hub of the adjacent wheel. The outer margin of the hub of the opposite wheel projects beyond the outer end of the corresponding portion of the axle, and is provided at its inner side with a series of recesses or notches 8. Rotatably mounted within the corresponding or adjacent portion 1, of the axle is a shaft 9, and this shaft projects beyond the opposite ends of said portion of the axle, and is provided with an adjustable collar 10, which, bearing against the inner end of said portion of the axle, prevents any longitudinal or outward movement of said shaft. Keyed or otherwise rigidly mounted upon the outer end of this shaft, is a collar 11, and this collar is provided with a series of radial projections 12, which engage the correspondingly-shaped recesses or notches 8 in the outer end of the adjacent hub, so that the movement or rotation of this wheel will cause through the medium of the interlocking collar, the rotation of the shaft 9.

Bolted to the under side and near the inner ends of the tubular portions 1 of the axle, (see Fig. 8) are the longitudinally extending and parallel angle irons or bars 13, and these angle irons are braced from lateral movement by the rods 13ª, connecting the said angle irons and the axle, and these angle irons are also pivoted at their front ends at 14 to the outer sides of an arch 15, the upper surface of which occupies the same horizontal plane as the upper surface of the axle-arch 2, and the lower and outwardly-turned ends 16 of this arch, which occupy a plane a suitable distance below the plane of the lower ends of the axle-arch, extend horizontally outward, and are bolted securely to the horizontal and longitudinally aligned tubular bars 17; said bars being rectangular in cross-section, and extending parallel with the tubular portions 1 of the axle. Bolted about midway their length to the under side and inner ends of the tubular portions 17, are the parallel and longitudinally extending angle irons 18, which are bolted at their front ends to the inner ends of a pair of transversely extending and horizontal angle-irons 19, and bolted upon and connecting said transversely extending angle-irons 19, is an arch 20, which has its upper surface in the same plane as the upper surface of the arches 15 and 2, and bolted to the upper sides of said arches and central thereof, is the longitudinally extending tongue 21 of the machine, and this tongue projects rearwardly to within a suitable distance of the axle arch 2, and is provided with longitudinally extending slots or openings 22 and 23.

Arranged parallel with and a suitable distance outward of each longitudinal angle-iron 18, is a similar angle-iron 24, which angle-irons are also bolted about midway their length to the tubular bars 17, and at their front ends to the transversely extending angle-irons 19. Each angle-iron 24 is also connected near its rear end with the adjacent and similar angle-iron 18, by the transversely extending bar 25. It will be apparent, by thus connecting the various longitudinal and transverse bars, that a strong and substantial structure is provided.

Pivotally mounted at 26 at the under side of the tongue 21, and a suitable distance in advance of the front arch 20, is the transversely extending double-tree 27, and pivotally connected to and depending from the opposite ends of said double-tree are the bars 28, and said bars, at their lower ends, are pivotally connected by the link-rods 29, with eyes 30 projecting from the transverse angle-irons 19. The bars 28 are each provided with a series of openings 31, and pivotally engaging an opening of each series is a clip 32, projecting from and carried by the single-trees 33. Supported upon the rear ends of the longitudinal angle-irons 13, is an arch 34, which, projecting vertically upward for a suitable distance, has secured thereon a suitable distance from its rear end, the longitudinal spring 35, the forward end of which is secured centrally to the axle arch 2, as shown at 36, and mounted upon the rear end of said spring, is the seat 37, of the usual or any preferred construction. Bolted to the front side or face of the axle arch, are the brackets 38, in which is journaled the transverse rock-shaft 39, and secured centrally to the under side of said rock-shaft, is the forked end 40 of an upwardly projecting lever 41, which is formed at its upper end with the transversely extending foot-portion 42, and extending longitudinally of the machine, and bolted about midway its length, in the forked portion 40 of the lever 41, is a lever 43, provided with a transversely extending foot-portion 44 at its rear end, and this lever is pivotally connected at its front end to the vertical rod 45, which projects upwardly through the opening 22, in the tongue when the machine is used as a corn planter or drill, and is provided with a collar or enlargement 46, which bears against the lower side of the tongue. A nut 47 is secured upon the upper end of said rod, and the spring 48, spirally encircling said rod, is interposed between the nut 47 and the collar 49, mounted loosely upon said rod, and holds the said collar with a yielding pressure against the upper side of the tongue. Mounted rigidly upon one end of the rock-shaft 39, is the lever 50, and this lever carries a spring-actuated rod 51, which engages one or another of a series of notches in a segment 52, which projects forwardly from the axle arch and a suitable distance below the said rock-shaft, and this spring-actuated rod may be disengaged from said segment by operating the hand lever 53, pivotally carried at the upper end of the lever 50.

From the foregoing it will be apparent that the driver upon the seat 37 may, by depressing the rear end of the lever 43, elevate the rear end of the tongue, and thereby the forward portion of the machine, from the ground, so as to avoid obstructions in the path of the machine, or by operating the lever 50 rearwardly he may accomplish the same purpose.

The construction described is common to all of the machines represented in this invention, as is also the employment of the soil-turning disks upon which the front portion of the machine is mounted, but as these soil-turning disks occupy different positions in the various machines, they are described in connection with each machine separately.

The following description relates to the construction of the machine when employed as a corn-planter. (See Figs. 1, 2, 11 and 12.)

A concaved rim 54, is secured by bolts and nuts around the tire of each wheel 3, and in order to remove or cleanse these concaved rims of any soil which may cling thereto in the operation of the machine, the transverse shaft 55 is journaled in the bearing brackets 56, projecting upwardly from and carried by the rear ends of the longitudinal angle-irons 13, and mounted rigidly upon the outer ends of said shafts, and opposite the concaved rims 54, are the scrapers 57. Projecting downwardly from the shaft 55, is an arm 58, which is connected through the medium of the link-rod 59 with the depending arm of the bell-crank lever 60, pivotally mounted in a bearing carried by the adjacent angle-iron 13, and by the operation of this bell-crank lever by means of foot-pressure, the scrapers 57 may be applied to the concaved rims 54 of the wheels. Bolted or otherwise rigidly secured upon the transverse and tubular extensions 17 of the arch 15, are the corn hoppers or receptacles 61, of the usual or any preferred construction, and the bottoms of these corn-hoppers are formed by the castings 62, which are bolted or secured in any suitable manner upon and to said tubular portions 17 and the longitudinal angle-irons 24. These castings are formed with the cavities 63, and with the depending boots or spouts 64, which are segmental in horizontal section, and have their open side disposed toward the rear, and these open sides are normally closed by the arms 65, which snugly close said open sides, and have their lower ends projecting forwardly as shown at 66, and closing the lower ends of said boots or spouts. These arms 65 are mounted rigidly at their upper ends upon the squared rock-shaft 67, which extends transversely of the machine and parallel with the shaft 69, which is formed cylindrical at the points of engagement with the castings 62, to allow of a rocking movement, and projecting upwardly from said rock-shaft are the arms 68, which are of construction suitable to be operated by a check-row wire, which wire, forming no part of our invention, is not described herein, or illustrated in the drawings. Arranged about midway between and parallel with the arch 15, and squared shaft 67, is the shaft 69, and said shaft is journaled, near its opposite ends, in the casting 62, and extends through the cavities 63. Mounted loosely upon the shaft 69, is a sprocket-wheel 70, which is provided with a ratchet clutch section 71 at one side, and this sprocket-wheel is connected through the medium of the endless chain 72, with the sprocket-wheel 73, mounted rigidly upon the inner end of the shaft 9. Mounted to slide upon and revolve with the shaft 69, is a clutch section 74, and this clutch section is adapted to be thrown in or out of engagement with the clutch section 71, by means of the spring-metal lever 75, which is pivotally carried by a bracket projecting from the adjacent portion of the arch 15, and this clutch section is held in one position or the other by means of the notched segment 76, carried by said bracket, and engaged by said lever.

From the foregoing, it will be apparent that the rotation of the drive-wheels will cause, through the medium of the shaft 9, the endless chain 72 and sprocket 70, the rotation of the shaft 69, and this rotation of the rod will allow the corn to descend from the hopper into the boots or ways 64, by the operation of any suitable feeding-mechanism located in the bottom of each hopper, which mechanism, forming no part of our invention, need not be described or illustrated herein, and at the same time, the rock-shaft 67, being operated at regular intervals by the check-row wire, (not shown) will move the arms 65 to the position shown in dotted lines, Fig. 12, and allow the corn to drop into the furrow. Bolted to the under side of the transverse angle-irons 19 (Figs. 1 to 6, inclusive) and depending vertically therefrom, are the yoke-castings 77, and journaled within and connecting said arms at their lower ends, are the shafts 78, upon which are clamped, the cutting disks 81 of the ordinary construction, and these castings are of such construction that the cutting lines of the disks converge rearwardly, so the soil turned thereby will be inward of the furrow. A pair of similar disks 82 are mounted upon the shafts 78 of the yoke-castings 77, which depend from and are bolted rigidly to the transverse tubular bars 17, outward of the longitudinal angle-irons 24, and these castings are arranged so that the cutting lines of the disks 82 shall converge forwardly, and shall therefore turn the soil outward of the furrow. A pair of yoke-castings 77 are also bolted rigidly to and depend from the longitudinal angle-irons 24 and the transverse angle-irons 25, and mounted rigidly upon the shafts 78, connecting the lower ends of the arms of said yoke-castings are the disk cutters 83, the cutting lines of which converge forwardly and are parallel with the cutting lines of the disks 82, and these cutting disks 83, are adapted to cover the corn or fill the furrow with the loose earth originally turned by the disks 81.

The construction of the lower ends of the yoke-castings and the connection therewith of the shafts 78, are peculiar and novel, and are as follows: The lower ends of the arms of the yoke-castings terminate in the cylindrical sleeves 84 (Fig. 9), and these sleeves are internally screw-threaded from their outer margins a suitable distance inward, as at 85, and said sleeves at their inner margins are formed with the inwardly projecting and annular flanges or shoulders 86; said flanges or shoulders projecting beyond the inner margin of the said cylindrical sleeves, for a purpose hereinafter explained, and adjacent to said shoulders, the internal diameters of the sleeves are increased, so as to form the annular recesses 87. The outer ends of the bore of the sleeves 84, are closed by the screw-plugs 88, which are provided with the rectangular projections 89, so that they may be manipulated by a wrench, and fitting snugly within said sleeves and against the said screw-plugs are washers 90, and fitting snugly within said sleeves also are the bearing-rings 91, which bear at their outer ends against the washers 90 and located in the recesses 87 and between each bearing ring and washer 92 is any suitable packing material; said material being packed tightly so that as it wears it will expand and prevent the dislocation or movement of the bearing rings 91 and washers 92, upon the shaft 78. The shaft 78 is also of peculiar construction, so as to withstand the great strain which is imposed upon it by reason of the disk cutting the soil at an angle to the line of travel. The internal diameter of the shaft is equal throughout its length, but the external diameter at the end which receives the thrust or pressure is of greater diameter than the opposite end. The shaft is also externally enlarged to form the shoulders 93, adjacent to the washers 92 and 93$^a$, against which bears the collar 94, which is mounted upon a part of the shaft diametrically smaller than the part forming the shoulders, and larger than the small end of the shaft, and this intermediate portion is externally screw-threaded at 95. The soil-turning disk is mounted upon the shaft and between the collars 94 and 96, and clamping the same firmly in position is a nut 97, which is mounted upon the threaded portion of the shaft and bears against the collar 96. In order to equally distribute the strain or side pressure upon each arm of the yoke, a tie-rod 97$^a$ extends axially through the shaft and centrally located apertures in the screw-plugs; its threaded end being engaged by a retaining nut 97$^b$, and its head bearing against the outer side of the opposite screw-plug. The hollow shaft is filled with any suitable lubricating material, which will work its way gradually beyond the ends of the shafts, so as to lubricate thoroughly the bearings, and this lubricating material will be, preferably, of a consistency approximating a paste, so that it will not be necessary to resupply the shaft except at regular intervals, say once a week.

From the foregoing, it will be apparent that we have produced a construction which allows of an automatic oil-flow to the bearings of the disk-shafts, and it will be apparent that to introduce the lubricating material it is necessary only to remove the tie-rod, one screw-plug and the adjacent washer, and that the lubricating material may be introduced at either end. It will furthermore be apparent that the washer and bearing rings, which are of leather, preferably, but may be of any other suitable material, when worn out may be replaced by new ones easily and expeditiously, and that the packing prevents the egress of oil and the ingress of dust, sand, &c.

From the above construction, it will be apparent that as the corn-planter is drawn across the field, the oppositely disposed disks 81 and 82 will open the furrow to the required depth and width. The rotation of the drive-wheels will, through the action of the mechanism alluded to, allow the corn to drop into said furrow, and this corn is covered by the loosely falling earth thrown out by the disks 82. The disks 83, by turning outward the soil turned up by the disks 81, will level said furrow, and the broad or extended tires 54 of the drive-wheels will pack the soil into place.

When it is desired to plant in the furrow only the two sets of disks 81 and 82 are employed.

When it is desired to clean out weeds or other foreign matter adjacent to the line of the furrow, the disk 81, at the left side of the machine as viewed from the rear, is transferred to the extreme right hand end of the angle-iron 19, and the disk 81, originally at the right-hand side of the machine, is transferred to the extreme left-hand end of the opposite angle-iron 19, and when in this position, as shown in dotted lines Fig. 1, all of the disks will turn the soil outwardly.

When it is desired to employ the machine as a seed-drill, the broad tires 54 are removed from the wheels 3, the rock-shaft 67 is removed, and the hoppers or seed-receptacles 61 are replaced by the hoppers or seed-receptacles 99, which extend from a point adjacent to each side of the tongue 21, to the outer ends of the transverse and tubular bars 17. The shaft 69 is also replaced by the shaft 100, upon which is mounted the sprocket-wheel 70 and the clutch-mechanism hereinbefore described, and this sprocket-wheel is connected through the medium of the chain 72 to the sprocket-wheel 73 of the shaft 9. The transverse bar 101 is bolted at either end upon the longitudinal angle-irons 18, and adjacent to the rear side of the arch 15, and depending from said bar and bolted rigidly thereto, are the yoke-castings 77, which carry cutting-disks 102 and 103, the cutting lines of which converge forwardly, so as to turn the soil outwardly. Similar cutting disks 104 are arranged parallel with the cutting-disks 102, and are carried by the yoke-castings depending rigidly from the transverse tubular bars 17 in any suitable manner. Cutting-disks 105, arranged parallel with the cutting-disk 103, are also carried by the yoke-castings depending from the opposite tubular bar 17, and these various cutting-disks are arranged at a regular and predetermined distance apart, and each cutting-disk has its cutting-center in the same vertical plane, and forward of a guide-tube or spout 106, depending from said receptacles 99, so that the seed will be deposited properly in the drill.

From the foregoing, it will be apparent that the rotation of the drive-wheels 3 will cause the operation of the shaft 100, and through the feeding-mechanism located in the bottom of the hoppers or seed-receptacles, which is of ordinary construction and not deemed necessary to describe herein, the seed is allowed to descend through the guide-tubes 106 into the drills, and is covered by the loosely falling soil.

When the machine is to be employed as a cultivator, the hoppers or seed-receptacles 99, the endless chain 72, the sprocket-wheel 70, and the clutch-mechanism adjacent thereto, and the sprocket-wheel 73, are removed. The key which secures the collar 11 upon the shaft 9 is removed, and the said shaft moved outwardly in the direction indicated by the arrow, Fig. 8, until the inner end thereof is flush with the inner end of its respective tubular section 1 of the axle, and the aperture therein is aligned with the opening in the collar 11, and when said shaft is in this position the key is again inserted through the aligned openings of the collar 11 and the shaft. This shaft is moved to this position so that it shall not interfere with the proper operation of the machine by coming in contact with and breaking or injuring the corn being cultivated, as would be the case did it occupy the position shown in full lines in Fig. 8. The bolts pivotally securing the front ends of the longitudinal angle-irons 13 of the arch 15 are now removed, Figs. 5 and 6, and the front portion of the machine, which comprises that portion supported by the cultivator disks hereinbefore referred to, is moved bodily to the rear until the openings in the arch 15 register with the second set of apertures in the longitudinal angle-irons 13, and bolts passing through these registering apertures pivotally connect the front and rear portions of the machine together. Before this is accomplished, however, the bolt carried by the lever 43 is disengaged from the opening 22, and when the tongue has assumed its new position relative to the axle-arch, said bolt and its component parts are operatively connected to the tongue by way of the opening 23, (see Figs. 5 and 6) in the manner previously described. The cross-bar 101, carrying the adjacent and oppositely disposed cultivator-disks 102 and 103, is now moved to the rear, and is bolted a suitable distance from each end upon the horizontal portion of the rearwardly diverging bars 107, which curve upwardly and are provided with foot-plates 108. From a point adjacent to the forward side or edge of the bar 101, the converging front portions of said bars 107 extend obliquely upward, and uniting at their front ends, are pivotally mounted upon the bolt employed to secure the tongue 21 upon the arch 15. One of the disks 104 is arranged with its cutting line parallel with the cutting line of the disk 102, and the yoke-casting of said disk is bolted or otherwise rigidly secured to the under side of one of the transverse bars 25, a little inward of its transverse center, and the other cutting-disk 104 has its cutting line arranged parallel with the disk 102, and the yoke-casting carrying said disk is bolted or otherwise rigidly secured to the under side of the adjacent tubular bar 17. One of the cutting-disks 105 has its cutting line arranged parallel with the cutting line of the disk 103, and the casting carried by said disk is bolted or otherwise rigidly secured to the other transverse bar 25 and slightly forward of its transverse center, and the other cutting-disk 105 has its cutting line arranged parallel with the cutting line of the disk 103, and the yoke-casting of said disk is bolted or otherwise rigidly secured to the opposite tubular portion 17. When the disks are in this position, and the corn is being cultivated, the disks 102 and 103 travel upon opposite sides of and turn the soil from the corn, as do also the cutting disks 104 and 105. Should the corn be endangered by the team drawing the machine out of the direct longitudinal line so that one or the other of the cutting-disks 102 or 103 shall approach too near the corn being cultivated, by applying pressure with the foot upon the foot-plate 108 at the corresponding side of the row of corn, said disk is embedded deeper in the soil, and by thus increasing the resistance at one side of the line of draft, the opposite disk, carried by the bar 101, will be deflected against its inclination, and will be caused to move nearer to the row of corn until the disks reattain their normal position relative to the corn, that is, until they are at equal distances or approximately so, from the row of corn being cultivated.

When it is desired to turn the soil inward in the cultivation of the corn, the bars 107 and the bar 101 are removed entirely from the machine, and the disks 102 and 103 are arranged with their cutting lines converging rearwardly, and the yoke-castings carrying said disks depend from and are secured, in any suitable manner, to the transverse angle-irons 19. The transverse bars 25 are now removed, and the bar carrying the cutting-disk 104 is secured in the position shown in dotted lines in Fig. 5, and the bar carrying the cutting-disk 105 is also transferred to the opposite side of the machine, and is secured in the position shown in dotted lines, same figure. The outermost cutting-disk 104 is now removed from the tubular bar 17, and transferred to the opposite side of the machine, and has its cutting line arranged parallel with the cutting line of the disk 102 in its dotted position; the yoke-casting of said disk being bolted or otherwise suitably secured to the correspondingly located tubular bar 17. The outermost cutting-disk 105 is also transferred to the opposite side of the machine, and is arranged with its cutting line parallel with cutting-disk 103 in its dotted position; the casting of said disk being bolted or otherwise rigidly secured to the correspondingly located tubular bar 17. When in this position, as clearly shown in dotted lines, Fig. 5, the cutting-disks will turn the soil inward toward the corn.

From the above description, it will be apparent that we have produced a framework which serves equally as a corn-planter framework, a seed-drill framework, and a straddle-row cultivator framework, which is simple, strong, durable, and inexpensive of construction.

Having thus described our invention, what we claim as new, and desire to secure by Letters Patent, is—

1. In a combined corn-planter, seed-drill and cultivator, the combination with a front framework suitably mounted, and a tongue rigidly carried by said framework, and having vertical apertures or openings, of a rear wheel-supported framework, a rock-shaft carried thereby, a lever projecting from said rock-shaft, a rod pivoted to said lever and projecting upwardly through one of the openings of the tongue, and having a fixed collar bearing against the under side of the tongue, a nut engaging the upper end of said rod, a spring spirally encircling said rod and interposed between said nut and the upper side of said tongue, and a hand-lever mounted upon said rock-shaft, substantially as set forth.

2. In a combined corn-planter, seed-drill and cultivator, the combination with a front framework suitably mounted, and a tongue rigidly carried thereby and having openings, of a rear wheel-supported framework carrying a seat, a rock-shaft supported in bearings secured to said framework, a foot-lever projecting upwardly and forwardly from and secured to said rock-shaft, a lever secured near its middle to the first-mentioned lever and having a foot-portion at its rear end adjacent to the seat, a rod pivoted to the front end of said lever and projecting through one of the openings of the tongue, a collar upon said rod bearing against the under side of the tongue, a nut at the upper end of said rod, a spring spirally encircling said rod and interposed between said nut and the upper side of the tongue, and means to secure said rock-shaft at any desired point in its adjustment, substantially as set forth.

3. In a combined corn-planter, seed-drill and cultivator, the combination with an arched axle, wheels mounted thereon, and longitudinally extending angle-irons or bars supported by said axle, of an arch arranged in longitudinal alignment with and forward of the axle-arch and pivotally connected to the longitudinal angle-irons, a second or front arch also longitudinally aligned with the axle-arch, transverse and horizontal bars or angle-irons carried by and projecting outwardly from said arches, short longitudinal angle-irons connecting said transverse bars near their outer ends, longitudinal angle-irons connecting the same and arranged a suitable distance inward of the first-mentioned short longitudinal angle-irons, and rotatable cutting-disks operatively connected to and supporting the front portion of the machine, substantially as set forth.

4. In a combined corn-planter, seed-drill and cultivator, the combination with a front disk-supported framework, of an arched axle having tubular and horizontal sections, wheels mounted loosely upon said tubular sections of the axle, a shaft mounted in one of said tubular sections, and rigidly connected to the hub of the adjacent drive or supporting wheel, and a sprocket-wheel mounted upon said shaft substantially as set forth.

5. In a disk-supported framework, the combination with yoke-castings depending from said framework and terminating in internally screw-threaded sleeves at their lower ends, of a shaft journaled in said sleeves, a disk mounted upon said shaft, and screw-plugs engaging the screw-threads and closing the outer ends of the said sleeves, substantially as set forth.

6. In a disk-supported framework, the combination with yoke-frames depending from said framework, and terminating at their lower ends in sleeves having a circular bore, of a tubular shaft journaled within said sleeves, removable plugs closing the outer ends of the bore of said sleeves, and washers fitting snugly within said sleeves and interposed between the plugs and the adjacent ends of the shaft, substantially as set forth.

7. In a disk-supported framework, the combination with a yoke-casting depending from said framework, terminating at its lower end in sleeves, of cylindrical bearing rings fitting snugly within said sleeves, and plugs closing the outer ends of the bore of said sleeves, substantially as set forth.

8. In a disk-supported framework, the combination with a yoke-casting depending from said framework and terminating in sleeves at its lower end, and removable plugs closing the outer ends of the bore of said sleeves, of bearing rings fitting snugly within said sleeves, a shaft journaled within said bearing rings, and washers interposed between the screw-plugs and the adjacent ends of the shaft and the bearing rings substantially as set forth.

9. In a disk-supported framework, the combination with a yoke-frame depending from said framework, and terminating in sleeves at its lower end, and removable plugs closing the outer ends of the bore of said sleeves, of bearing rings fitted within said sleeves, a shaft journaled in said bearing rings, annular flanges projecting inwardly from the inner ends of said sleeves, washers surrounding said shaft within said sleeves and bearing against said flanges, adjacent to the external surface of the shaft, and packings fitting in said sleeves and surrounding said shaft and interposed between the bearing rings and the washers bearing against said annular flanges, substantially as set forth.

10. In a disk-supported framework, the combination with a yoke frame depending from said framework and terminating in sleeves at its lower end, of a shaft journaled within said sleeves and having an annular and external shoulder, and also externally screw-threaded, a collar mounted upon said shaft and bearing against said shoulder, a second collar, a disk mounted upon said shaft and between said collars, and a nut engaging the threaded portion of said shaft and holding the collars and the disk firmly in position, substantially as set forth.

11. In a disk-supported framework, the combination with a yoke-casting depending from said framework and terminating in sleeves at its outer end, and plugs closing the outer ends of the bore of said sleeves, of a hollow reservoir shaft for lubricating material, and a disk mounted rigidly upon said shaft, substantially as set forth.

12. In a disk-supported framework, the combination with yoke-castings depending from said framework and terminating in sleeves at its lower end, of a shaft journaled within said sleeves, plugs closing the outer ends of the bore of said sleeves, and a tie-rod extending axially through said shaft and centrally through said plugs, and a retaining nut engaging the threaded projecting end of said tie-rod, substantially as set forth.

In testimony whereof we affix our signatures in presence of two witnesses.

MATTHEW P. SIMPSON.
ELI P. WILLIAMS.

Witnesses:
JOHN KERN,
JACOB STROUSE.